United States Patent Office

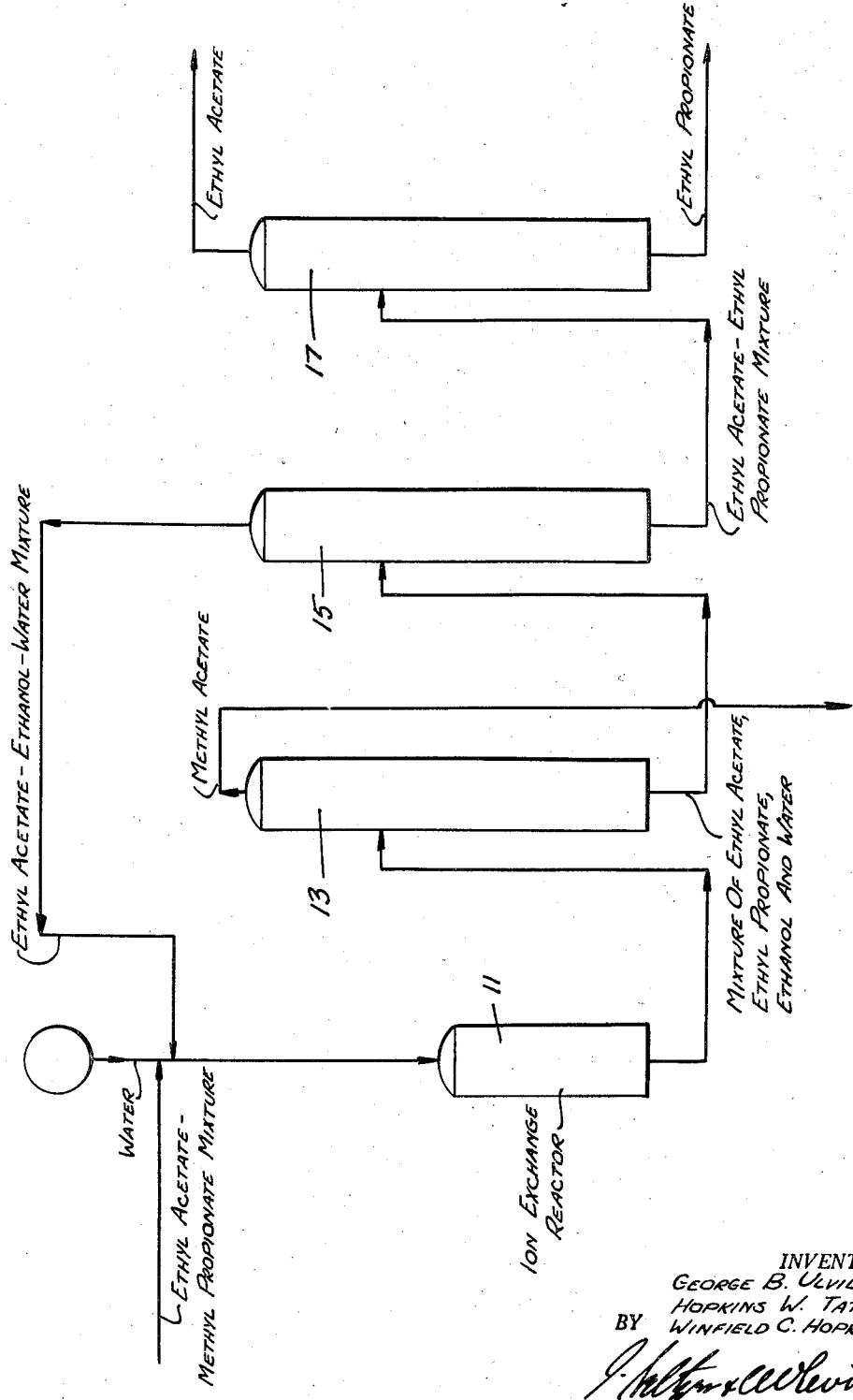

2,862,962
Patented Dec. 2, 1958

2,862,962

ESTER EXCHANGE CATALYZED BY CATION-EXCHANGE MATERIALS

George B. Ulvild, Robstown, and Hopkins W. Tatum and Winfield C. Hopkins, Corpus Christi, Tex., assignors to Celanese Corporation of America, New York, N. Y., a corporation of Delaware Application February 6, 1956, Serial No. 563,591

14 Claims. (Cl. 260—491)

This invention relates to reactions of esters and relates more particularly to ester-exchange reactions.

It is an object of this invention to provide a novel and efficient process for effecting an ester exchange reaction between two esters.

Another object of this invention is the provision of a new continuous process for the removal of methyl propionate from ethyl acetate, which process involves an ester exchange reaction between said esters.

Other objects of this invention will be apparent from the following detailed description and claims. In this description and claims all proportions are by weight unless otherwise indicated.

The accompanying drawing shows a flow sheet of the process of this invention.

In accordance with one aspect of this invention a mixture of esters is passed through a bed of a acidic cationic exchange material to effect an ester exchange reaction between said esters. It is found that the activity of the cation exchange material for catalyzing this reaction is maintained at a high level, and the reaction may be carried out continuously for long periods of time, when the mixture of esters contains a small amount of water or of an alcohol, or both.

In one convenient process in accordance with this invention, water is added continuously to the fresh feed comprising the mixture of esters to be treated. During the passage of the mixture through the bed of acidic cation-exchange material the water reacts with at least one of the esters to produce an alcohol. A stream containing this alcohol is separated continuously, by a distillation operation, from the products of reation and is recycled continuously into admixture with the fresh feed. Thus, both water and the alcohol are incorporated into the reaction mixture and the amount of the alcohol present in the reaction mixture and in the recycled stream can be regulated by controlling the amount of water which is added.

The proportion of water or alcohol, or both, present in the reaction mixture should be a minor fraction, e. g. less than about one fourth, of the stoichiometric amount which would effect complete splitting, e. g. hydrolysis or alcoholysis or both, of the esters in said reaction mixture. Thus, when a mixture of water and an alcohol is used, it is generally preferred to have present in the reaction mixture less than about 4 mole percent of water and less than about 12 mole percent of alcohol, based on the number of moles of the esters present, in order to avoid excessive splitting of the esters into the corresponding alcohols and acids. Too high a concentration of the alcohol is also generally undesirable in that the alcohol reacts in the presence of the acidic cation exchange material to produce an ether. As a practical minimum, the water and alcohol should represent at least about 12 mole percent of the stoichiometric proportion which would be necessary for complete splitting of the esters.

The preferred acidic cation-exchange materials for use in the process of this invention are high molecular weight, generally cross-linked, organic resins containing free sulfonic acid groups attached to carbon atoms. Particularly good results have been obtained by the use of a sulfonated styrenedivinyl benzene copolymer such as that known as "Amberlite IR 120." In place of the cation-exchange resin other materials which provide a strong acid type of insoluble fixed catalyst, e. g. sulfonated coal, or suitable insoluble salts of strong acids and weak bases may be employed, if desired. The bed of acidic cation-exchange material may be a fixed bed or it may be in fluidized form.

The process of this invention finds its greatest utility in the ester-exchange reaction of a mixture of methyl propionate and ethyl acetate. Such a mixture may be obtained, for example, as a result of the purification of the products of the controlled partial oxidation of hydrocarbons. The boiling points of the methyl propionate and ethyl acetate are very close to each other and it is therefore difficult to separate these two esters by conventional distillation methods. However, as a result of the ester-exchange reaction there is obtained a mixture of esters which do differ sufficiently in their boiling points to make separation by distillation practicable. Thus, in one preferred embodiment, illustrated in the drawing, a mixture composed of a major proportion of ethyl acetate and a minor proportion (e. g. about 6 to 12%) of methyl propionate is treated to convert substantially all of the methyl propionate to methyl acetate and ethyl propionate which are then separated from the ethyl acetate by distillation.

Referring now more specifically to the drawing, reference numeral 11 indicates a reactor containing a bed of particles of an acidic cation-exchange resin. There are fed continuously into this reactor a stream containing the ethyl acetate-methyl propionate mixture to be treated, a stream of water, and a recycle stream containing ethyl acetate, ethanol and water, to be described more fully below. The amount of recycle stream employed is preferably such that the concentration of methyl propionate in the total feed to the reactor is about 2% or less. The stream emerging from the reactor 11 contains ethyl acetate, methyl acetate and ethyl propionate, as well as water and ethanol. It may also contain very small amounts of methyl propionate, acetic acid, propionic acid, methanol and diethyl ether. This stream is then passed continuously into the intermediate portion of a distillation column 13. The overhead from the column 13 is primarily methyl acetate, with small amounts of the methanol and the diethyl ether, while the residue leaving the bottom of this column comprises the ethyl acetate, the ethyl propionate, the ethanol and the water. This residue is subjected to continuous distillation in a second distillation column 15, the overhead from the column 15 being recycled to the reactor 11, and the residue, comprising ethyl acetate and ethyl propionate, being separated into its two main components in a third distillation column 17, which may be operated batchwise or continuously. As illustrated in the drawing, the overhead from the column 17 is ethyl acetate while the residue is ethyl propionate.

In the operation of the process illustrated in the drawing, the recycling of the ethanol has the additional desirable result of minimizing the hydrolysis of the ethyl acetate component of the mixture being treated. The proportion of ethanol obtained and used in this process may be regulated efficiently by changing the amount of added water in accordance with changes in the ethanol content in the stream leaving the reactor 11 or in the stream distilled from the column 15. Thus, when the ethanol content in one of the latter streams is lower than that desired, the amount of added water is increased, thus increasing the amount of hydrolysis of the esters and therefore the amount of alcohol present. Conversely, when the proportion of ethanol increases too much the amount of added water is decreased. For optimum results (when treating feed mixtures containing small proportions of methyl propionate), the concentrations of water and ethanol, by weight, in the mixture fed to the reactor are about 0.5 to 0.8% and 4 to 6%, respectively.

The reactor containing the bed of acidic cation-exchange material is preferably maintained at an elevated temperature, e. g. 50 to 200° C., in order to accelerate the reaction. When the reaction mixture contains relatively low boiling components, it is often necessary to maintain the reaction zone under a superatmospheric pressure in order to keep these components in the liquid phase. A temperature of 90 to 120° C. gives best results when the cation-exchange material is a sulfonated insoluble styrene copolymer.

While the invention has been illustrated primarily with mixtures of ethyl acetate and methyl propionate, it will be understood that in its broadest aspects the process of this invention is applicable to the ester exchange reaction of mixtures of esters generally. Examples of such mixtures of esters are mixtures of methyl acetate and ethyl formate, mixtures of methyl propionate and n-propyl formate, mixtures of ethyl butyrate and n-propyl propionate, mixtures of methyl butyrate and propyl acetate, or mixtures of propyl butyrate and butyl propionate. It is generally desirable to employ as the added alcohol one of those which may be derived by hydrolysis of one of the esters present in the mixture. The ester-exchange reaction may be employed for the synthesis of esters from other esters or it may be used for the purification, as described above, of esters containing other esters as impurities. In the latter case it is preferable that the added alcohol be the one obtainable by hydrolysis of the desired ester.

The ester-exchange process of this invention may be operated continuously for long periods of time at high efficiencies without the necessity of regenerating or otherwise treating the bed of acidic cation-exchange material. In fact, the process may even be practiced using beds of acidic cation-exchange material which have lost their activity due, for example, to improper operation. In this case, the continuous incorporation of the alcohol or the water into the fresh feed of mixed esters results in the gradual restoration, and the further maintenance, of the activity of the catalyst.

It is desirable that the reaction mixture in contact with the cation-exchange material be homogeneous. When the ester-exchange reaction involves a high molecular weight highly water-immiscible ester, such as glycerol tristearate, there is a tendency for undesired phase separation to occur. In such cases it is advantageous to insure homogeneity by the addition of a suitable solvent (e. g. acetone or methyl ethyl ketone) which is inert to the ester-exchange reaction and which is easily separated, as by distillation, from the products of the reaction.

The following example is given to illustrate this invention further.

*Example*

A mixture of esters is fed in a continuous stream, at such a rate as to supply 1871 parts of ethyl acetate and 204 parts of methyl propionate per hour, and is blended continuously with a stream of water flowing at the rate of 23 parts per hour and with a recycle stream which supplies 7560 parts of ethyl acetate, 540 parts of ethyl alcohol and 63 parts of water per hour. The resulting blended stream, containing about 2% of methyl propionate, is fed to a reactor where it passes through a bed of "Amberlite IR-120," maintained at a temperature of 90° C. and a pressure of 35 pounds per square inch gauge, the residence time of the mixture in the bed being 2½ hours. The stream of mixture leaving the bed is then fed continuously to a distillation column, where methyl acetate, methanol and ether are removed overhead, the residue from this column being led continuously to a second distillation column where the aforesaid recycle stream of ethyl acetate, ethyl alcohol and water is removed overhead at the rate indicated above. The residue from the second column is then fed to a third distillation column where ethyl acetate is obtained as the overhead stream at the rate of over 1500 parts per hour.

It is to be understood that the foregoing detailed description is merely given by way of illustration and that many variations may be made therein without departing from the spirit of our invention.

Having described our invention, what we desire to secure by Letters Patent is:

1. Process for the treatment of a mixture of esters, which comprises continuously passing a mixture of esters comprising an ester of a lower alkanol and a lower alkanoic acid and an ester of another lower alkanol and another lower alkanoic acid, together with an hydroxyl compound, selected from the group consisting of a lower alkanol and water, the amount of said hydroxyl compound being a minor fraction of the stoichiometric amount necessary to effect complete splitting of said esters, into a reaction zone comprising a bed of an acidic cation-exchange material to effect an ester-exchange reaction between said esters, said hydroxyl compound acting to maintain the activity for ester interchange of said cationic exchange material.

2. Process for the treatment of a mixture of esters, which comprises continuously passing a stream of a mixture of esters comprising an ester of a lower alkanol and a lower alkanoic acid and an ester of another lower alkanol and another lower alkanoic acid, together with an hydroxyl compound selected from the group consisting of a lower alkanol and water, the amount of said hydroxyl compound being a minor fraction of the stoichiometric amount necessary to effect complete splitting of said esters, into a reaction zone comprising a bed of an acidic cation-exchange material to effect an ester-exchange reaction between said esters, said hydroxyl compound acting to maintain the activity for ester interchange of said cationic exchange material, distilling a lower alkanol from the resulting stream of reaction products, and continuously recycling said lower alkanol to said reaction zone.

3. Process as set forth in claim 1 in which said cation-exchange material is a cross-linked resin containing free sulfonic acid groups.

4. Process for the treatment of esters which comprises continuously passing a mixture of ethyl acetate and methyl propionate, together with an hydroxyl compound selected from the group consisting of a lower alkanol and water, the amount of said hydroxyl compound being a minor fraction of the stoichiometric amount necessary to effect complete splitting of said esters, into a reaction zone comprising a bed of an acidic cation-exchange material to effect an ester-exchange reaction between said esters, said hydroxyl compound acting to maintain the activity for ester interchange of said cation-exchange material.

5. Process as set forth in claim 4 in which water is continuously added to a stream of said mixture of ethyl acetate and methyl propionate flowing to said reaction zone.

6. Process as set forth in claim 4 in which the resulting stream leaving said reaction zone contains ethyl alcohol and said ethyl alcohol is separated by distillation from said resulting stream and is recycled to said reaction zone.

7. Process as set forth in claim 4 in which water is continuously added to a stream of said mixture of ethyl acetate and methyl propionate flowing to said reaction zone, and in which the resulting stream leaving said reaction zone contains ethyl alcohol and said ethyl alcohol is separated by distillation from said resulting stream and is recycled to said reaction zone.

8. Process for the treatment of esters which comprises continuously flowing a mixed ester stream comprising ethyl acetate and methyl propionate to a reaction zone containing a heated bed of a cross-linked cation-exchange resin having free sulfonic acid groups, introducing a stream of water into said reaction zone, the amount of water being a minor fraction of the stoichiometric amount necessary to effect complete hydrolysis of said esters, effecting in said zone an ester exchange reaction between said esters and a hydrolysis reaction of said esters to produce a product stream comprising methyl acetate, ethyl propionate, ethyl acetate, and ethanol, continuously distilling methyl acetate from said product stream, continuously distilling a mixture comprising ethanol and ethyl acetate from the residue of said distillation, and continuously recycling the last-mentioned mixture to said reaction zone.

9. Process as set forth in claim 8 in which the residue of the last-mentioned distillation comprises ethyl acetate and ethyl propionate and in which this residue is distilled to separate said ethyl acetate overhead.

10. Process for the treatment of esters which comprises continuously flowing a mixed ester feed stream comprising ethyl acetate and a minor proportion, above 2%, of methyl propionate to a reaction zone containing a heated bed of a cross-linked cation-exchange resin having free sulfonic acid groups, introducing a stream of water into said reaction zone, the amount of water being a minor fraction of the stoichiometric amount necessary to effect complete hydrolysis of said esters, effecting in said zone an ester exchange reaction between said esters and a hydrolysis reaction of said esters to produce a product stream comprising methyl acetate, ethyl propionate, ethyl acetate, and ethanol, continuously distilling methyl acetate from said product stream, continuously distilling a mixture comprising ethanol and ethyl acetate from the residue of said distillation, and continuously recycling the last-mentioned mixture to said reaction zone, the amount of said last-mentioned mixture being recycled being sufficient to reduce the concentration of methyl propionate, in the total mixture fed to said reaction zone, to not above about 2%.

11. Process as set forth in claim 10 in which the concentrations of water and ethanol in the total mixture fed to the reaction zone are about 0.5 to 0.8% and about 4 to 6%, respectively.

12. Process as set forth in claim 11 in which said reaction zone is maintained under superatmospheric pressure and said distillations are conducted under atmospheric pressure.

13. Process as set forth in claim 10 in which the temperature in the reaction zone is 50 to 200° C. and the reaction zone is maintained under a superatmospheric pressure sufficient to maintain all the constituents of the reaction mixture in the liquid phase.

14. Process as set forth in claim 13 in which the reaction temperature is 90 to 120° C. and the resin is a sulfonated insoluble styrene copolymer.

References Cited in the file of this patent

UNITED STATES PATENTS 1,860,092     Graves _____ May 24, 1932

OTHER REFERENCES

Sussman: Ind. Eng. Chem. 38 (1946) 1228–30.